United States Patent [19]
Kawai et al.

[11] Patent Number: 5,479,203
[45] Date of Patent: Dec. 26, 1995

[54] VIDEO CAMERA APPARATUS WITH ZOOM CONTROL BASED ON THE PAN OR TILT OPERATION

[75] Inventors: Hisashi Kawai, Kanagawa; Masami Kojima, Tokyo; Eiichi Sato, Kanagawa, all of Japan

[73] Assignee: Canon Kabushiki Kaisha, Tokyo, Japan

[21] Appl. No.: 46,073

[22] Filed: Apr. 12, 1993

[30] Foreign Application Priority Data

Apr. 20, 1992 [JP] Japan .................................. 4-099685

[51] Int. Cl.$^6$ ..................................................... H04N 7/15
[52] U.S. Cl. ............................................. 348/15; 348/358
[58] Field of Search .............................. 348/15, 14, 207, 348/358, 16, 211, 373, 369; H04N 7/14

[56] References Cited

FOREIGN PATENT DOCUMENTS

| 2170691 | 7/1990 | Japan | H04N 7/15 |
| 5056426 | 3/1993 | Japan | H04N 7/15 |
| 5199521 | 8/1993 | Japan | H04N 7/15 |

*Primary Examiner*—Wendy R. Greening
*Attorney, Agent, or Firm*—Robin, Blecker, Daley & Driscoll

[57] ABSTRACT

A video camera apparatus for a video conference is arranged to detect the zoom level of a zoom lens by a zoom level detecting circuit and to control a motor control circuit according to the result of detection in such a way as to lower the speed of a panning or tilting operation on a video camera accordingly as the position of the zoom lens shifts from a wide-angle position to a telephoto position. In panning or tilting the video camera in a zoom-in state, this arrangement makes the panning or tilting speed lower than the speed of panning or tilting performed in a zoom-back state, so that the movement of objects on a picture displayed on a monitor can be effectively moderated to make the details of the display easily discernible without any unpleasant impression. The arrangement thus facilitates the operation on the video camera.

16 Claims, 13 Drawing Sheets

FIG.1
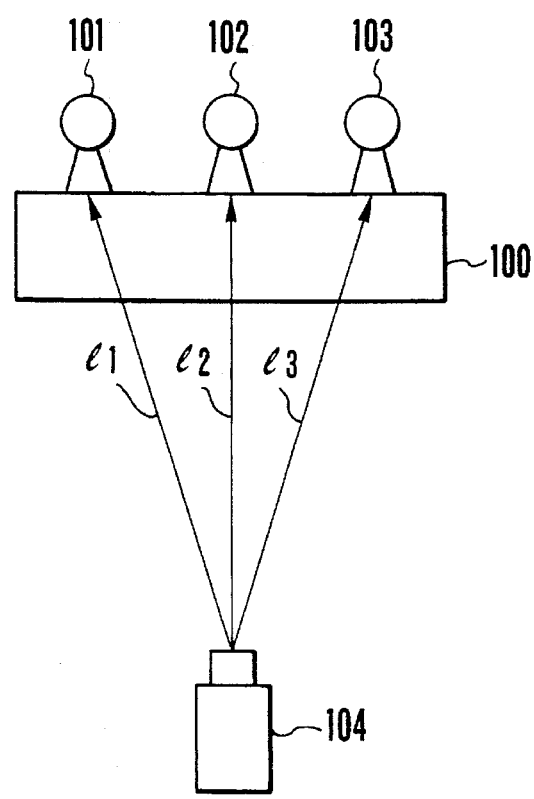
FIG.2(a)    FIG.2(b)    FIG.2(c)
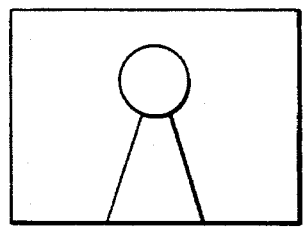 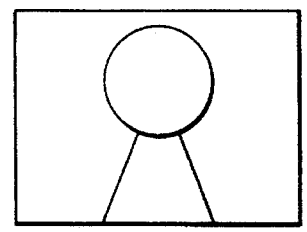 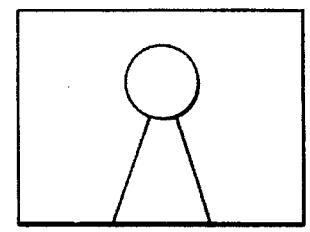

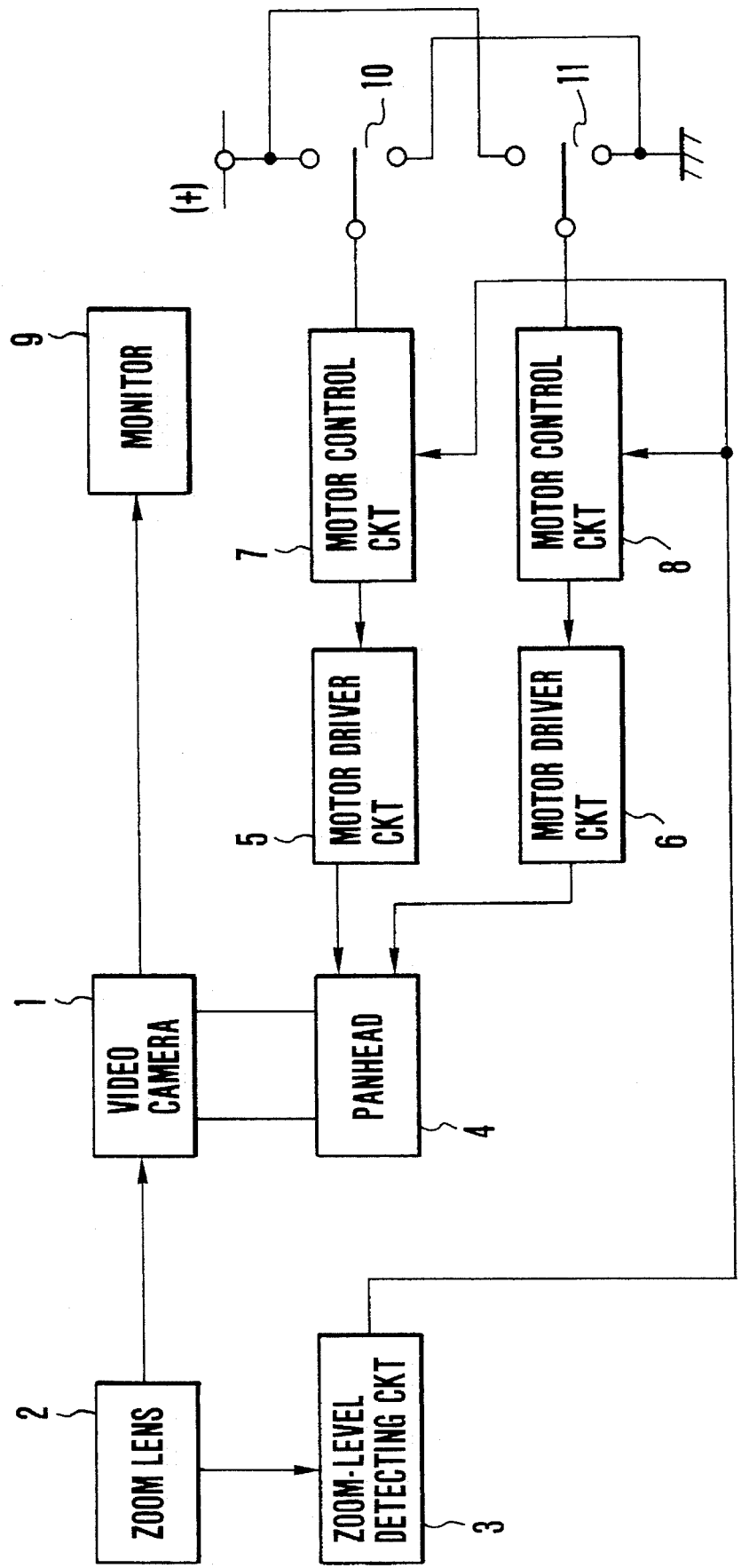

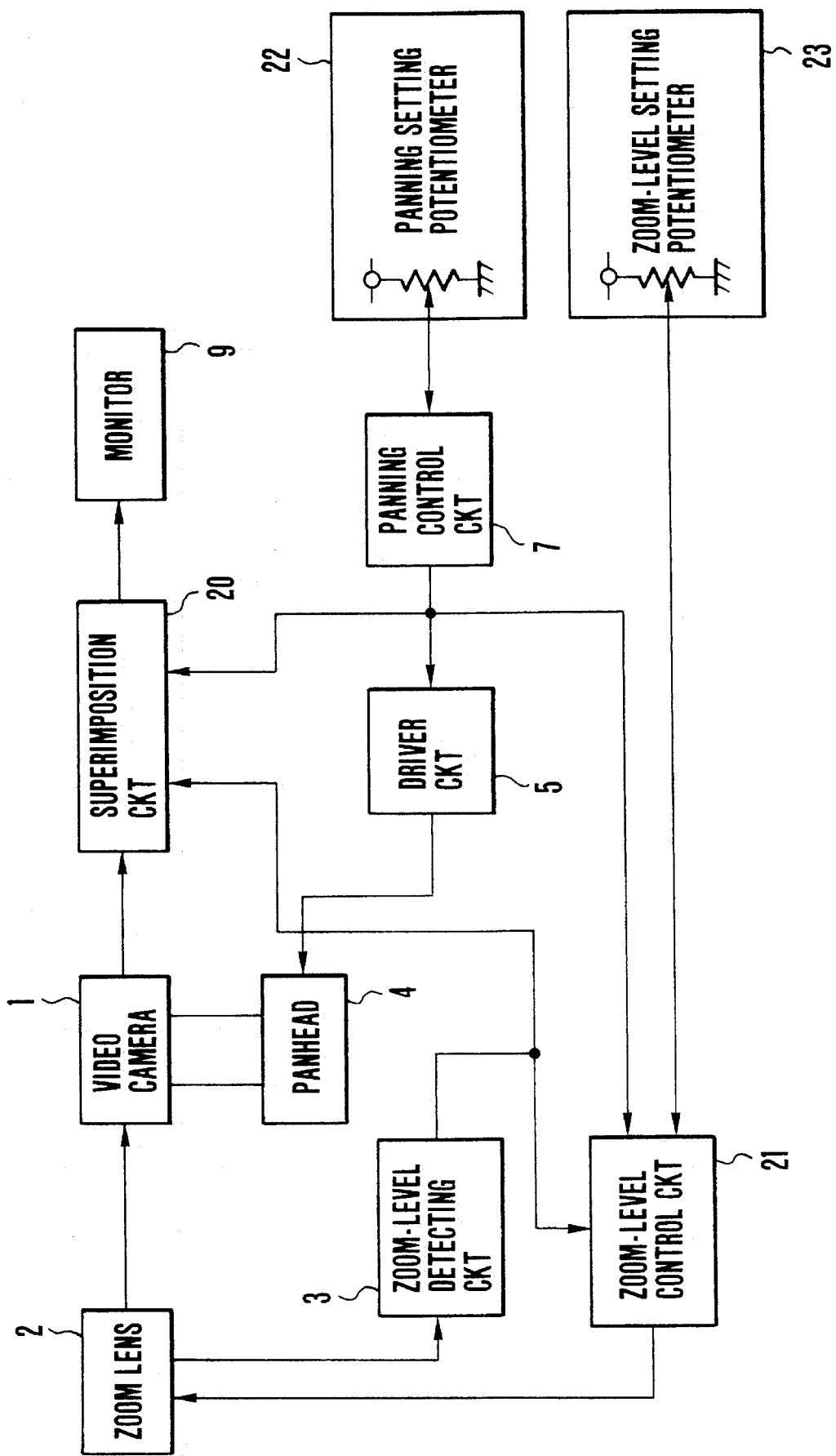

VIDEO CAMERA APPARATUS WITH ZOOM CONTROL BASED ON THE PAN OR TILT OPERATION

BACKGROUND OF THE INVENTION

1. Field of the Invention

This invention relates to a video camera apparatus arranged to pick up the images of persons participating in a conference, etc., for example, in a system called a video conference system or the like.

2. Description of the Related Art

Heretofore, the images of persons have been picked up by means of a video conference system under such a condition that is, for example, as shown in FIG. 1. In the case of FIG. 1, participants 101, 102 and 103 in a conference are sitting at a table 100. The conference is assumed to be held between two remotely separated places. A video camera 104 is arranged to be panned to pick up the image of any of the participants who is speaking. Then, a video signal and an audio signal obtained by the video camera are transmitted from one conference place to the corresponding conference place via transmission means (not shown) to be displayed as an image and a voice on a monitor which is disposed at the corresponding conference place.

At the remote corresponding conference place, a video camera is likewise arranged to pick up the images and voices of other participants under a condition similar to that shown in FIG. 1. When a participant speaks at the remote corresponding conference place in reply to the speaker displayed on the monitor, the video camera is panned to pick up the image of the second speaker. Video and audio signals thus obtained are transmitted back to the conference place of the first speaker.

The conventional video conference system which is arranged to pick up images in the above-stated manner, however, has presented the following problems:

a) If the video camera which is in a state of having been zoomed in for a speaker is panned from the speaker to a next speaker, a picture displayed on the monitor too vigorously changes. The vigorous change either hardly enables the participants at the corresponding conference place to see what is going on at that moment or makes it difficult for the camera operator to direct the video camera to the next speaker. However, if the panning operation is slowly performed to avoid this difficulty, the video camera cannot be moved and directed to the next speaker in time for the commencement of the speach he or she is making.

b) Since the participants 101, 102 and 103 in the conference are at different distances 11, 12 and 13 from the video camera 104, the images of the participants are picked up in different shot sizes as shown in FIGS. 2(a), 2(b) and 2(c) when the video camera is panned.

c) The video conference system is generally arranged to pan or tilt the video camera on a motor-operated panhead with the former secured to the latter. However, since the weight of the video camera is imposed on the panhead, the moving speed of the panhead is limited.

d) The problems a), b) and c) mentioned above cause the images to appear unpleasantly for participants on the corresponding side of the conference, i.e., image receiving side, and tend to momentarily confuse them as to the position of the speaker on the transmitting side.

These problems take place also in cases where the video camera must be tilted to pick up the images of vertically aligned participants in a conference.

SUMMARY OF THE INVENTION

This invention is directed to the solution of the problem mentioned in the foregoing. It is, therefore, an object of the invention to provide a video camera apparatus which is arranged to allow the video camera to be panned or tilted in consideration of the zoom ratio of a zoom lens mounted thereon, so that its audience can be prevented from having any unpleasant feeling and from being confused when panning or tilting is performed.

To attain this object, a video camera apparatus which is arranged as an embodiment of this invention comprises a video camera, a support base arranged to have the video camera secured thereto and to permit camera work including at least a panning operation or a tilting operation on the video camera, zoom level detecting means for detecting the zoom level, i.e., the focal length, of a zoom lens which is mounted on the video camera, and support base driving means for driving the support base for panning or tilting at a speed corresponding to an output of the zoom level detecting means.

A video camera apparatus which is arranged as another embodiment of this invention comprises a video camera, a support base arranged to have the video camera secured thereto and to permit camera work including at least a panning operation or a tiling operation on the video camera, support base driving means for driving the support base for panning or tilting, and zooming control means arranged to zoom back a zoom lens mounted on the video camera while the support base is driven for panning or tiling by the support vase driving means.

A video camera apparatus which is arranged as a further embodiment of this invention comprises a video camera, a support base arranged to have the video camera secured thereto and to permit camera work for panning, speaker direction detecting means arranged near the video camera to detect a direction in which a speaker currently speaking among a plurality of speakers is located, distance determining means for determining a distance from the video camera to the current speaker on the basis of an output of the speaker direction detecting means, and zoom level control means for controlling the zoom level of a zoom lens mounted on the video camera on the basis of an output of the distance determining means in such a way as to make the shot size of the current speaker the same as that of any of other speakers despite panning when the video camera is directed to the current speaker by panning the video camera through the support base.

The above and other objects and features of the invention will become apparent from the following detailed description of embodiments thereof taken in conjunction with the accompanying drawings.

BRIEF DESCRIPTION OF THE DRAWINGS

FIG. 1 shows a state of picking up the images of persons participating in a conference.

FIGS. 2(a), 2(b) and 2(c) show a state in which the images of the participants in the conference are picked up by the conventional video conference system.

FIG. 3 is a block diagram showing the arrangement of a first embodiment of this invention.

FIG. 4 is a block diagram showing the arrangement of a second embodiment of this invention.

DETAILED DESCRIPTION OF THE PREFERRED EMBODIMENTS

Figure 5:
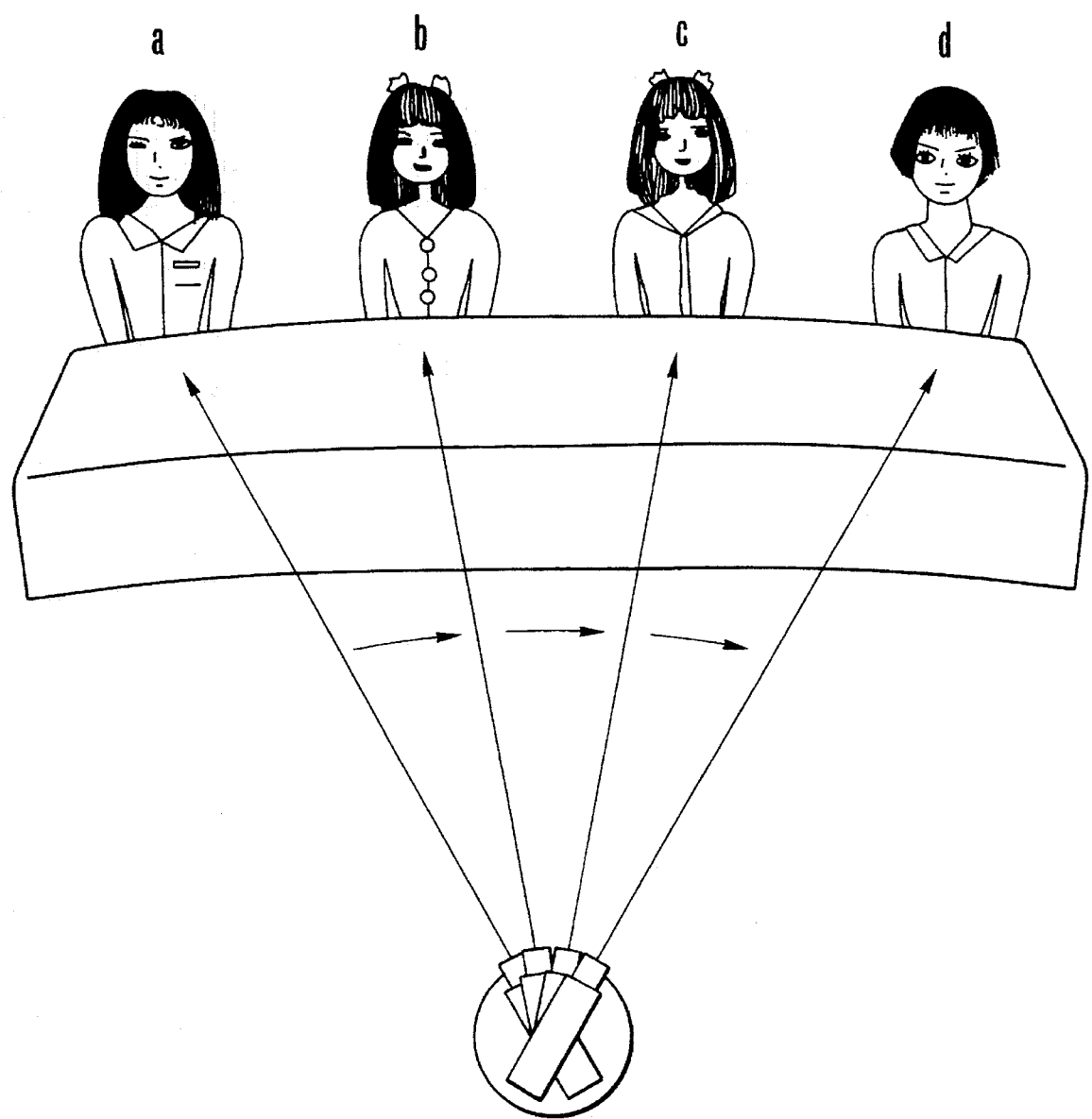
FIG. 5 shows an action of the second embodiment.

The invention is described in detail through preferred embodiments thereof as follows:

EMBODIMENT I

FIG. 3 shows in a block diagram a video camera apparatus arranged as a first embodiment of the invention. The illustration includes a video camera 1, a zoom lens 2, a zoom level detecting circuit 3 which is arranged to detect the zoom level of the zoom lens 2, a panhead 4 which is arranged to permit the facing direction of the video camera 1 to be deflected up and down and right and left, a (panning) motor driver circuit 5 which is arranged to move the panhead 4 right and left, a (tilting) motor driver circuit 6 which is arranged to move the panhead 4 up and down, a motor control circuit 7 which controls the motor driver circuit 5, a motor control circuit 8 which controls the motor driver circuit 6, a monitor 9 which is arranged to display the output signal of the video camera 1, a switch 10 which is provided for instructing the motor control circuit 7 to move the panhead 4 to the right or to the left and is arranged to be in connection only when it is pushed, and a switch 1 which is provided for instructing the motor control circuit 8 to move the panhead 4 either upward or downward and is arranged to be in connection only when it is pushed.

Next, the operation of the first embodiment is described as follows: The zoom level (focal length) of the video camera 1 is first assumed to be 35 mm, for example. When the operator pushes the switch 10 to connect it to the positive side of a power supply for the purpose of turning the facing direction of the video camera 1 to the right, the motor control circuit 7 outputs to the motor driver circuit 5 a voltage of 10 V which is present, for example, to be used when the zoom level of the video camera is 35 mm. The motor driver circuit 5 then current-amplifies the voltage inputted from the motor control circuit 7 and drives a panhead driving motor (not shown) to move the panhead 4 in such a way as to pan the video camera to the right, for example, at a speed of 10°/sec. Next, when the operator performs a zooming operation to obtain a zoom level of 80 mm and causes the switch 10 again to be connected to the positive side for the purpose of turning the video camera 1 further to the right, for example the motor control circuit 7 sends out to the motor driver circuit 5 a voltage value of, say, 5 V which is preset for the zoom level of 80 mm of the zoom lens 2. Upon receipt of the voltage 5 V from the motor control circuit 7, the motor driver circuit 5 current-amplifies the input voltage and causes the above-stated motor to be driven to move the panhead 4 to the right, for example, at a speed of 5°/sec. While a panning action on the video camera 1 is described above, a tilting action also can be controlled in the same manner.

In the case of the first embodiment, the panning or tilting speed of the panhead (or a support base) is controlled in such a way as to decrease as the zoom level shifts from a wide angle level to a telephoto level (from a so-called full shot to a so-called up shot). The panning or tilting speed is thus arranged to be lower in a so-called zoom-in state than in a so-called zoom-back state. By virtue of this arrangement, the image of an object displayed on the monitor moves moderately so as to facilitate discernment of the details of the display without giving any unpleasant impression. As a result, the video camera can be more easily operated.

EMBODIMENT II

FIG. 4 shows in a block diagram a video camera apparatus which is arranged according to this invention as a second embodiment thereof. In FIG. 4, all the component parts indicated by the same reference numerals as those of FIG. 3 are arranged to act basically in the same manner as those of the first embodiment. Referring to FIG. 4, the illustration includes a video camera 1, a zoom lens 2, a zoom level detecting circuit 3 which is arranged to detect the zoom level of the zoom lens 2, a superimposition circuit 20 which is arranged to superimpose, for example, a white frame or the like on the output signal of the video camera 1 and output a resultant signal, a zoom-level control circuit 21 which is arranged to control the telephoto and wide-angle positions of the zoom lens 2, a monitor 9 which is arranged to display the output signal of the superimposition circuit 20, a panhead 4 which is arranged to permit a panning or tiling operation on the video camera 1, a driver circuit 5 which is arranged to pan the panhead 4, a panning control circuit 7 which is arranged to supply information on the speed and direction of the panning action to be performed on the panhead 4 to the superimposition circuit 20, the zoom-level control circuit 21 and the driver circuit 5 in accordance with a voltage set by a panning setting potentiometer 22, the panning setting potentiometer 22 which is provided for setting an extent to Which the video camera 1 is to be panned, and a zoom-level setting potentiometer 23 for setting a telephoto or wide-angle position of the zoom lens 2.

Next, the operation of the second embodiment is described as follows: The zoom level of the video camera 1 is assumed to be, for example, 15 mm. When the operator causes the panning setting potentiometer 22 to shift its position from a center position as much as 1 V on its positive side for the purpose of panning the video camera 1 to the right, the voltage of 1 V is inputted to the panning control circuit 7. The panning control circuit 7 then sends to the driver circuit 5 and the superimposition circuit 20 a signal for causing the panhead 4 to pan to the right at a speed of 5°

C./sec. A similar signal is also sent to the zoom-level control circuit 21. The zoom-level control circuit 21 stores therein a zoom level value of 15 mm which is detected by the zoom-level detecting circuit 3, and changes the zoom level to a value of 10 mm in accordance with the values of 15 mm and 5°/sec. The zoom-level detecting circuit 3 then detects the change of the zoom level from 15 mm to 10 mm, and sends the result of detection to the superimposition circuit 20. The superimposition circuit 20 stores therein the zoom level of 15 mm when a panned state of the video camera 1 is detected via the panning control circuit 7. The superimposition circuit 20 then superimposes a white frame of the same size as the image plane on the video signal received from the video camera 1, and outputs a resultant signal to the monitor 9. Upon detection of the fact that the output signal of the zoom-level detecting circuit 3 becomes lower, the superimposition circuit 20 compares the zoom level "15 mm" obtained before panning with the current zoom level "10 mm" and reduces, in accordance with a ratio thus obtained, the size of the superimposing white frame with the center of the image plane used as a fiducial point. The white frame thus reduced is superimposed on the video signal, and a resultant signal is displayed on the monitor 9.

When the panning setting potentiometer 22 is shifted by the operator from the above-stated position of 1 V to a position of 2 V for the purpose of panning the video camera 1 further rightward at a high speed, the panning control circuit 7 receives a signal indicating the shift. Upon receipt of the signal, the panning control circuit 7 changes its output signal to cause the driver circuit 5 to drive the panhead 4 in such a way as to change the panning speed of the panhead 4 to a speed of 10° C./sec. The zoom-level control circuit 21 also receives this output signal. Upon receipt of this output signal, the zoom-level control circuit 21 changes the zoom level of the zoom lens 2 from 10 mm to 5 mm. The zoom-level detecting circuit 3 then detects the change of the zoom level from 10 mm to 5 mm and sends its output signal to the zoom-level control circuit 21. At the same time, the zoom-level detecting circuit 3 sends out to the superimposition circuit 20 a signal indicating that the current zoom level is 5 mm. Upon receipt of the signal, the superimposition circuit 20 reduces the size of the white frame on display as much as an amount corresponding to the change in zoom level. The white frame of the reduced size is then superimposed on the video signal coming from the video camera 1 to be outputted to the monitor 9. If the panning setting potentiometer 22 is brought back to its center position when a part of the scene to which the video camera 1 is intended to be directed comes into the white frame on the monitor 9, the panning control circuit 7 outputs a signal for bringing the panning action of the panhead 4 to a stop. Upon receipt of this signal, the driver circuit 5 causes the panning action of the panhead 4 to be terminated. The zoom-level control circuit 21 which also receives the panning stop signal controls the zoom lens 2 in such a way as to have the zoom lens 2 at the zoom level obtained before the commencement of the panning action. In other words, the zoom level is shifted to 15 min. The zoom-level detecting circuit 3 then detects the gradual increase of the zoom level. The zoom-revel detecting circuit 3 sends information on the increasing zoom level to the zoom-level control circuit 21 and also to the superimposition circuit 20. The superimposition circuit 20 then gradually increases the size of the white frame on display according to the change in the signal from the zoom-level detecting circuit 3. When the zoom level becomes the same as the level obtained before the panning action and it is confirmed from a signal sent from the panning control circuit 7 that the panning action no longer continues, the superimposition circuit 20 ceases to superimpose the white frame. Incidentally, the above-stated process of superimposing the white frame according to the zoom level is applicable also to the first embodiment.

While the panning action on the video camera has been described above, a tilting action can be controlled in the same manner. Further, the panning and tilting actions also can be simultaneously carried out likewise according to the speed setting voltages.

Figure 6C:
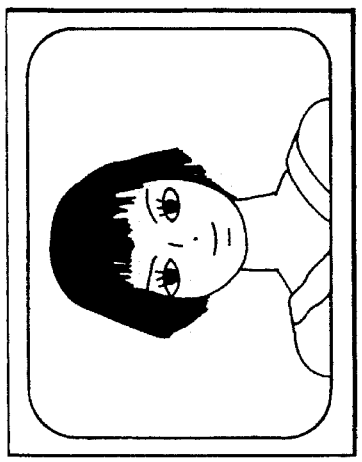
FIGS. 6(a), 6(b) and 6(c) also show the action of the second embodiment.
Figure 6B:
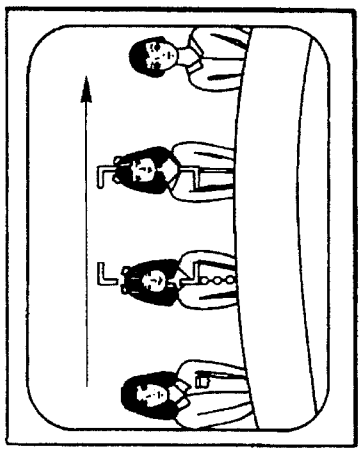
Figure 6A:
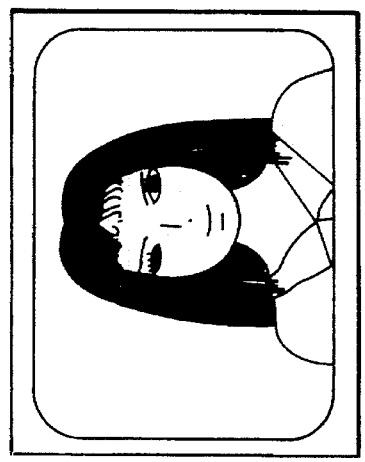

One example of the operation of the second embodiment is described with reference to FIGS. 5, 6(a), 6(c) and 6(c) as follows: Referring to FIG. 5, there are participants "a", "b", "c" and "d" in a conference. After the end of a speech made by the participant "a", the video camera 1 is panned from the participant "a" over to the participant "d" when the participant "d" begins to speak. In this instance, a picture displayed on the monitor 9 changes in a manner as shown in FIGS. 6(a) to 6(c). More specifically, the picture changes from a close-up shot of the participant "a" as shown in FIG. 6(a) through a full shot showing all the participants "a", "b", "c" and "d" as shown in FIG. 6(b) to a close-up shot of the participant "d" as shown in FIG. 6(c).

In other words, the second embodiment is arranged as follows: In driving the video camera 1 for panning or tilting, the position of the zoom lens 2 is first zoomed back to a zoom level according to the panning or tilting speed and a zoom level obtained before panning or tilting. After that, the video camera 1 is panned or tilted. Therefore, the changes of objects on the picture displayed on the monitor 9 moderately take place to make the details of the scene easily discernible without giving any unpleasant impression. The invented arrangement thus makes the video camera 1 easily operable.

EMBODIMENT III

Figure 7:
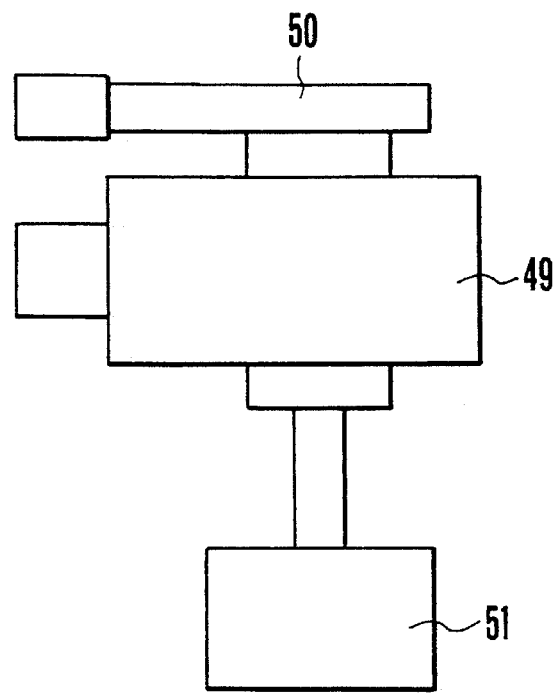
FIG. 7 is a side view showing an apparatus arranged as a third embodiment of this invention.
Figure 8:
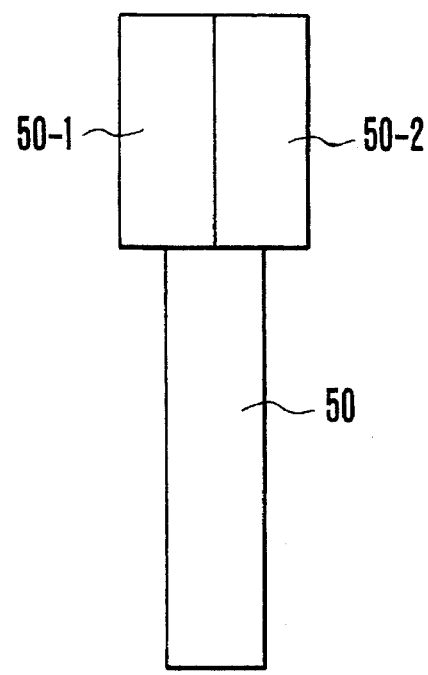
FIG. 8 is a plan view showing a microphone used for the third embodiment of the invention.

FIG. 7 shows in a side view a video camera apparatus which is arranged according to this invention as a third embodiment thereof. The illustration includes a video camera 49, a microphone 50 for inputting sounds; and a panhead 51 which is arranged to permit the video camera 49 to be panned or tilted. FIG. 8 shows the microphone 50 as viewed from above. Referring to FIG. 8, the microphone 50 consists of a left sound microphone 50-1 for inputting sounds obtained on the left side of the video camera 49 and a right sound microphone 50-2 for inputting sounds obtained on the right side of the video camera 49.

Figure 9:
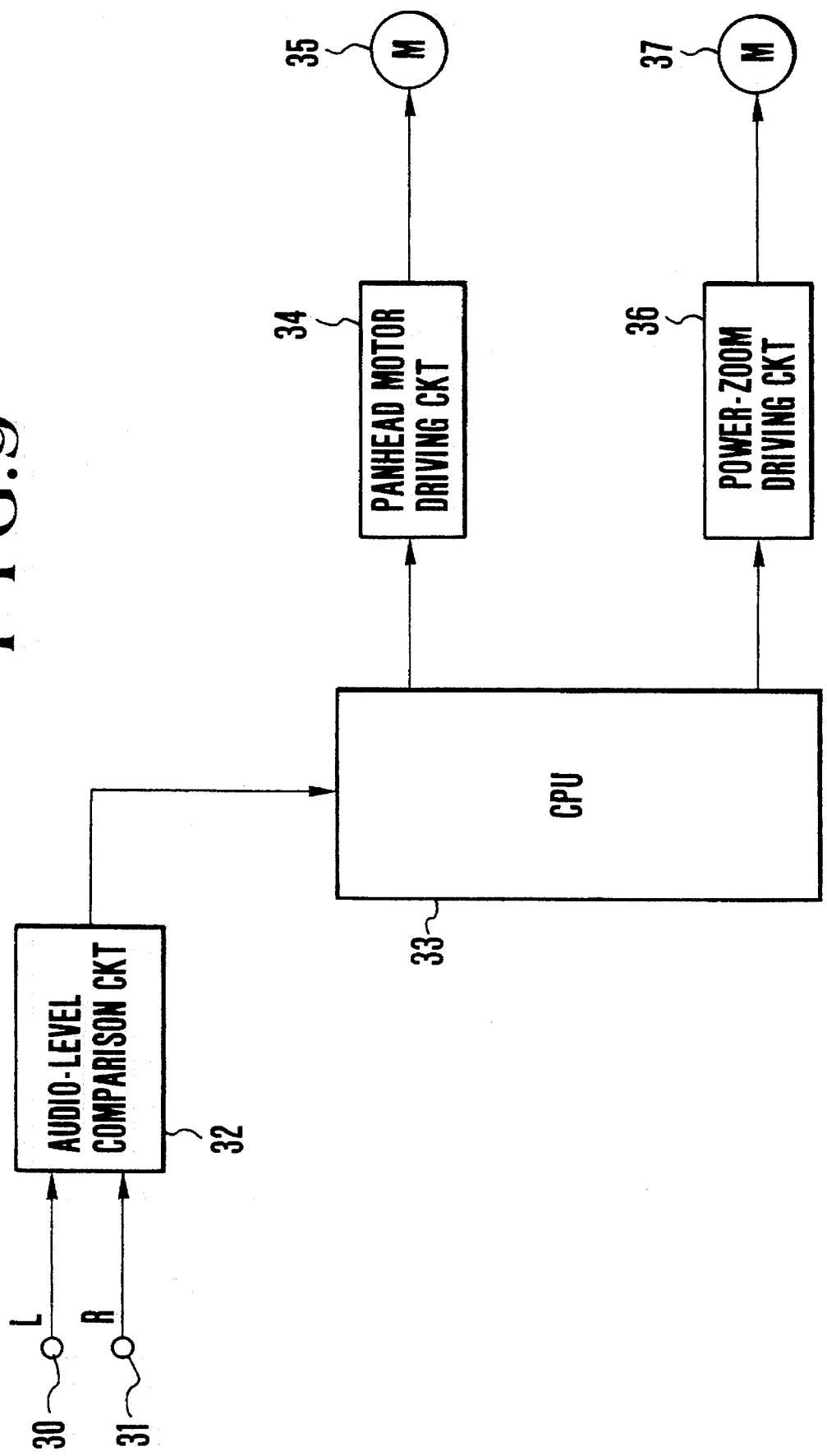
FIG. 9 is a block diagram showing a control part of the third embodiment.

FIG. 9 is a block diagram showing a control part of the third embodiment. Referring to FIG. 9, a left audio signal input terminal 30 is provided for receiving an audio signal from the left sound microphone 50-1. A right audio signal input terminal 31 is provided for receiving an audio signal from the right sound microphone 50-2. An audio-level comparison circuit 32 is arranged to compare the level of the audio signal inputted from the left audio signal input terminal 30 with that of the audio signal inputted from the right audio signal input terminal 31. A CPU 33 is arranged to perform control over the whole video camera apparatus. A panhead motor driving circuit 34 is arranged to drive a panhead motor 35 which is provided for driving the panhead 51. The illustration further includes a power-zoom driving circuit 36 and a motor 37 which is provided for electric power zooming.

In a video conference system such as the one shown in FIG. 1, when the participant 101 speaks in the conference, for example, the third embodiment which is arranged as described above operates as follows: With the participant 101 assumed to be speaking, the voice of the participant 101 is picked up by the microphone 50 which is mounted on the upper part of the video camera 49. Since the microphone 50 has a stereophonic input arrangement, the left and right sound microphones 50-1 and 50-2 input the sounds of the voice independently of each other. The sounds are converted into audio signals by the microphone 50. The audio signals thus obtained are inputted from the left and right audio signal input terminals 30 and 31 to the audio-level comparison circuit 32 as shown in FIG. 9. The audio-level comparison circuit 32 then compares the level of the left audio signal with that of the right audio signal. The result of comparison is sent to the CPU 33. The CPU 33 then sends to the panhead motor driving circuit 34 a signal for causing the video camera 49 to be directed toward the source of the higher level audio signal on the basis of the result of comparison. The panhead motor driving circuit 34 then converts this signal into a motor driving signal for driving the motor 35 in the direction as instructed by the CPU 33. The motor 35 is rotated in response to the motor driving signal. The panhead 51 is driven by the rotation of the motor 35. As a result, the video camera 49 is panned in the desired direction. These actions are repeated until the levels of the right and left audio signals become equal to each other. When the right and left audio signal levels become equal to each other, the CPU 33 causes the driving action on the panhead 51 to be brought to a stop. The video camera 49 is thus directed toward the participant 101 who is currently speaking. In this instance, if a rectilinear distance l2 between the video camera 104 and another participant 102 as shown in FIG. 1, for example, is known and if an angle defined by the camera 104 and the participants 102 and 101 is 90 degrees, a rectilinear distance l1 between the video camera 104 and the participant 101 can be obtained in accordance with the following formula from a rotation angle by which the video camera 104 is turned to the participant 101:

distance $l1$= distance $l2$/cos (panning angle)

With the rectilinear distance l1 between the video camera 104 and the participant 101 obtained by the CPU 33 in accordance with the formula shown above, the CPU 33 determines the zoom ratio of the video camera 104 from this distance l1 and sends a instruction to the power-zoom driving circuit 36 for zooming in this zoom ratio. In accordance with the instruction from the CPU 33, the power-zoom driving circuit 36 drives the motor 37 to change the zoom ratio accordingly.

The formula shown above applies to a case where the angle defined by the camera 104 and the participants 102 and 101 is 90 degrees. In cases where participants in a conference are in alignment with a specific curvature, the embodiment can be satisfactorily operated by setting the specific curvature within the CPU 33.

Figures 10A, 10B, 10C:
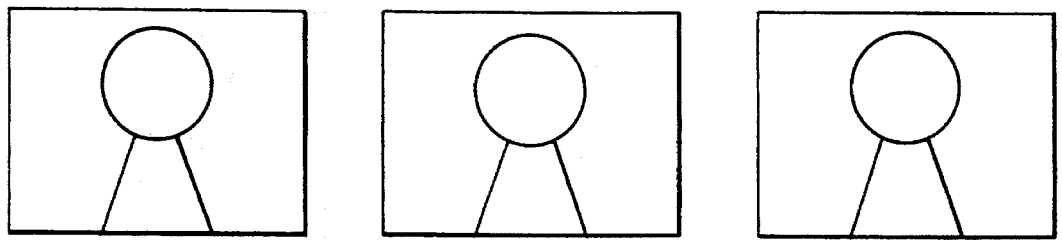
FIGS. 10 (a), 10(b) and 10(c) show a state obtained by third and fourth embodiments of the invention.

With the third embodiment arranged to operate as described above, the participant 101 which would have been image as shown in FIG. 2(a) according to the conventional apparatus can be imaged as shown in FIG. 10(a). All the participants thus can be displayed in the same size on a monitor which is disposed at the corresponding conference place (on the signal receiving side).

Further, since a distance between the camera and each of the participants can be found in the manner described, the focus of the video camera can be arranged to be automatically adjusted on the same principle.

In accordance with the arrangement of the third embodiment, all the participants at each of two remotely separated conference places can be displayed in the same size on the monitor disposed at the other conference place despite panning, so that the conference can be carried on without having any unpleasant display of images.

EMBODIMENT IV

While the third embodiment is arranged to obtain the distance between the video camera and each participant on the basis of the direction in which the speaking participant is located, the fourth embodiment of this invention is arranged to obtain the distance by means of an automatic focusing mechanism of the video camera.

Figure 11:
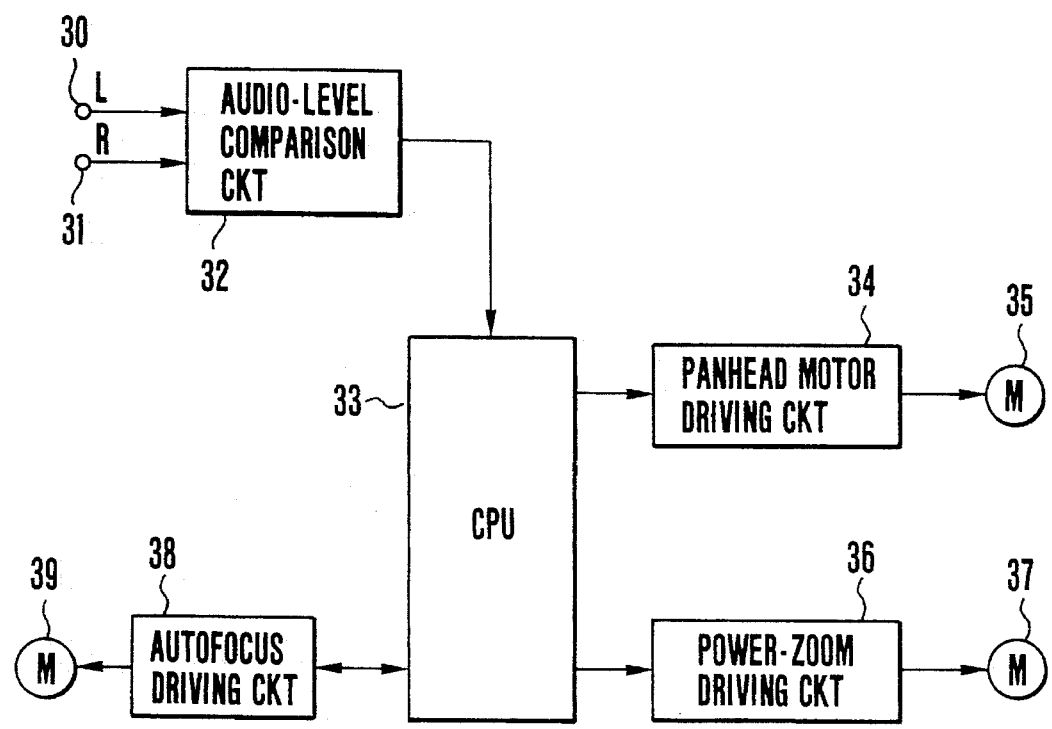
FIG. 11 is a block diagram showing a control part of the fourth embodiment of the invention.

FIG. 11 shows in a block diagram a control part of the fourth embodiment. As shown, in the case of the fourth embodiment, an automatic focusing mechanism (38 and 39) is added to the third embodiment shown in FIG. 9.

Assuming that the embodiment is used also for a video conference system which is arranged as shown in FIG. 1, since the action of directing the video camera 104 toward the participant 101 who is currently speaking is performed in the same manner as in the case of the third embodiment, that action is omitted from description.

After the participant 101 is caught by the video camera 104, the CPU 33 instructs an autofocus driving circuit 38 to perform automatic focusing. In response to this instruction, the autofocus driving circuit 38 drives an autofocus motor 39 to carry out an automatic focusing action. When an in-focus state is attained, the autofocus driving circuit 38 sends information on the distance to the object (the participant 101, in this instance) to the CPU 33. The CPU 33 obtains a rectilinear distance l1 between the video camera 104 and the participant 101. The CPU 33 then determines the zoom ratio of the video camera 104 from the distance l1 and instructs the power-zoom driving circuit 36 for zooming according to the zoom ratio. In response to the instruction, the power-zoom driving circuit 36 drives the motor 37 to change the zoom ratio accordingly.

With these actions carried out, the image of the participant 101 which would have been obtained in a state as shown in FIG. 2(a) by the conventional apparatus is obtained by the embodiment in a state as shown in FIG. 10(a). Then, as shown in FIGS. 10(a), 10(b) and 10(c), the image of each participant is displayed in the same size as that of another on the monitor disposed at the corresponding conference place. The fourth embodiment thus gives the same advantageous effect as in the case of the third embodiment.

EMBODIMENT V

Figure 12:
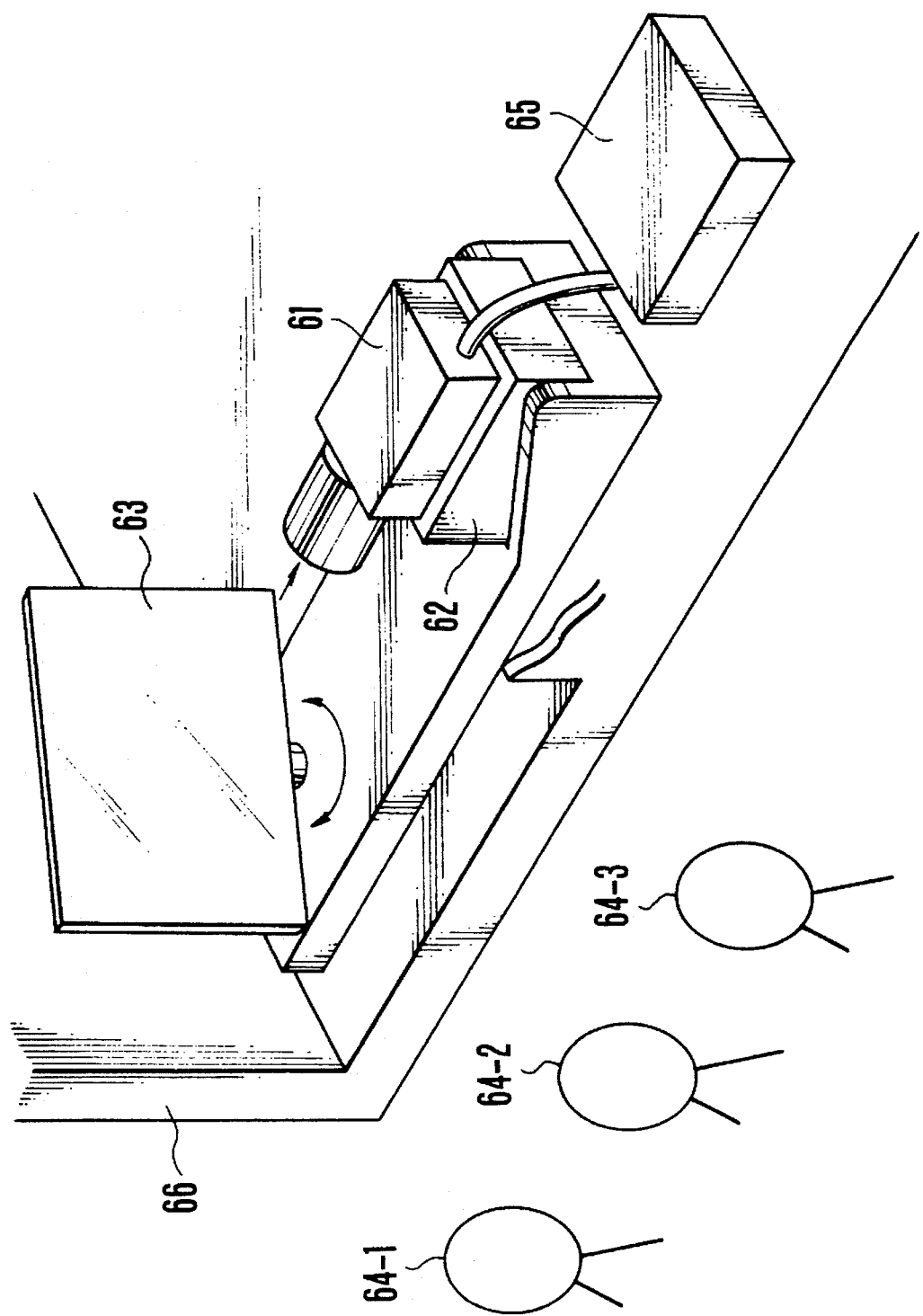
FIG. 12 is an oblique view showing in outline an apparatus arranged as a fifth embodiment of the invention.

FIG. 12 shows in an oblique view a video camera apparatus arranged according to this invention as a fifth embodiment thereof. Referring to FIG. 12, a video camera 61 which is provided for image input is secured to a panhead 62 for a tilting action on the video camera 61. A mirror member 63 is disposed in front of the video camera 61. The video camera 61 is thus arranged to pick up the mirror images of participants 64-1, 64-2 and 64-3 in a conference which are obtained on the mirror member 63. The mirror member 63 is rotatably secured to a part of the panhead 62 in such a way as to permit a panning operation on the video camera 61 by its rotation. Further, since the image picked up by the video camera 61 is a mirror image, the fifth embodiment is provided with an image processing device 65 for inverting the mirror image with regard to right and left.

Figure 13:
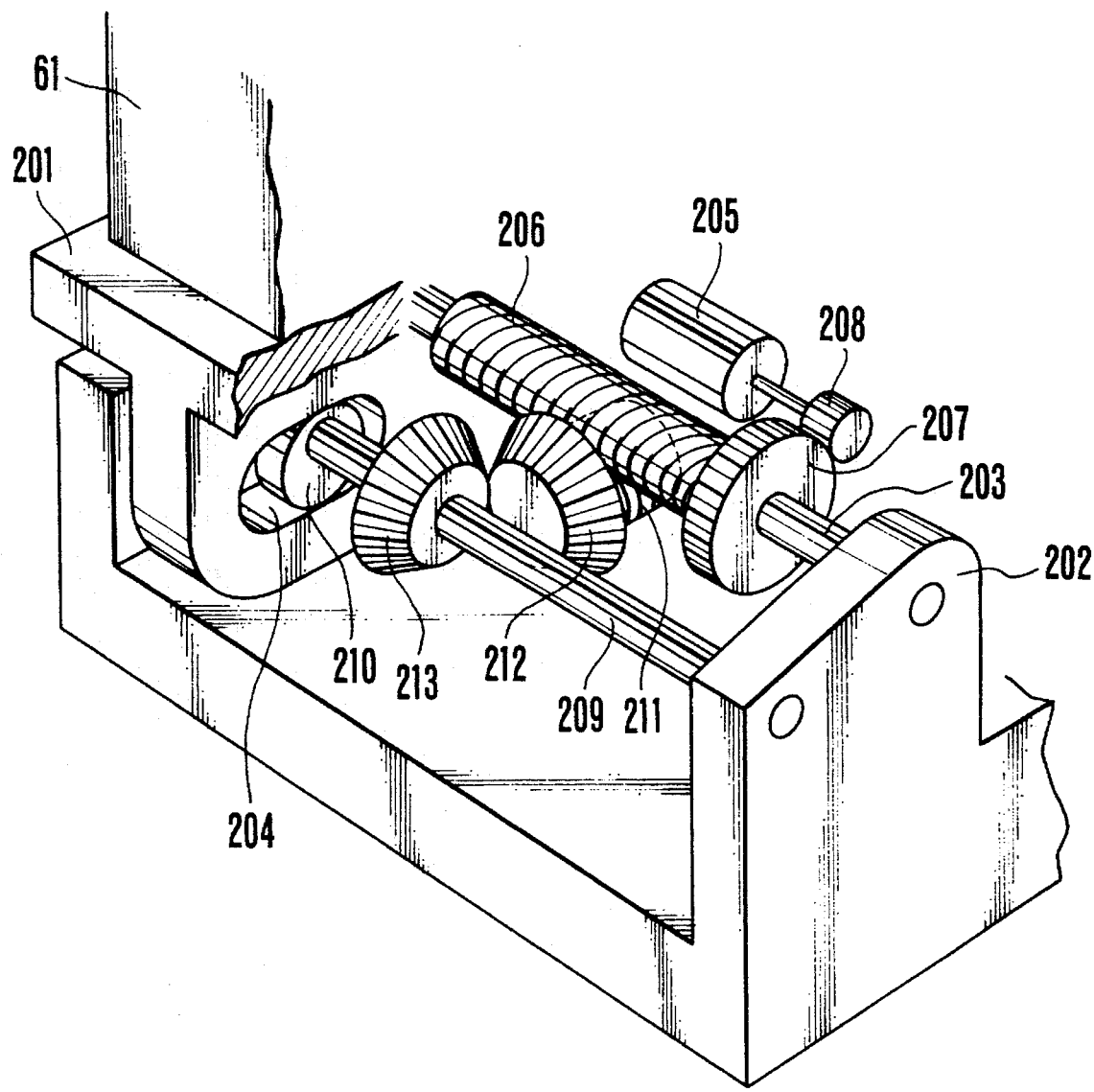
FIG. 13 is an oblique view showing a tilting driving part of the fifth embodiment of the invention.

FIG. 13 shows the details of the panhead 62 for a tilting action. Referring to FIG. 13, a moving base 201 has the video camera 61 secured thereto. The moving base 201 is turnable on a shaft 203 which is carried by a stationary base 202. A worm 206 is formed on the shaft 203. A gear 207 is formed at one end of the worm 206. The moving base 201 is provided with a slot part 204. The slot part 204 engages a cam 210. The cam 210 is secured to a shaft 209 which is rotatably carried by the stationary base 202. Driving means 205 is placed on the stationary base 202. An ordinary DC motor is employed as the driving means 205. The DC motor 205 is arranged to be controlled by a power supply and control means which are not shown.

The tilting action of the fifth embodiment which is arranged in this manner is described as follows: When the driving means or the DC motor 205 is driven, the gear 208 rotates. The rotation of the gear 208 causes the worm 206 to rotate via the gear 207. The rotation of the worm 206 is transmitted via a helical gear 211 disposed below the worm 206 to a bevel gear part 212 which is formed in one body with the helical gear 211. The bevel gear part 212 then causes a bevel gear 213 disposed on the shaft 209 to rotate. The rotation of the bevel gear 213 causes the cam 210 to rotate. The tilting action is thus performed by the moving base 201.

Figure 14:
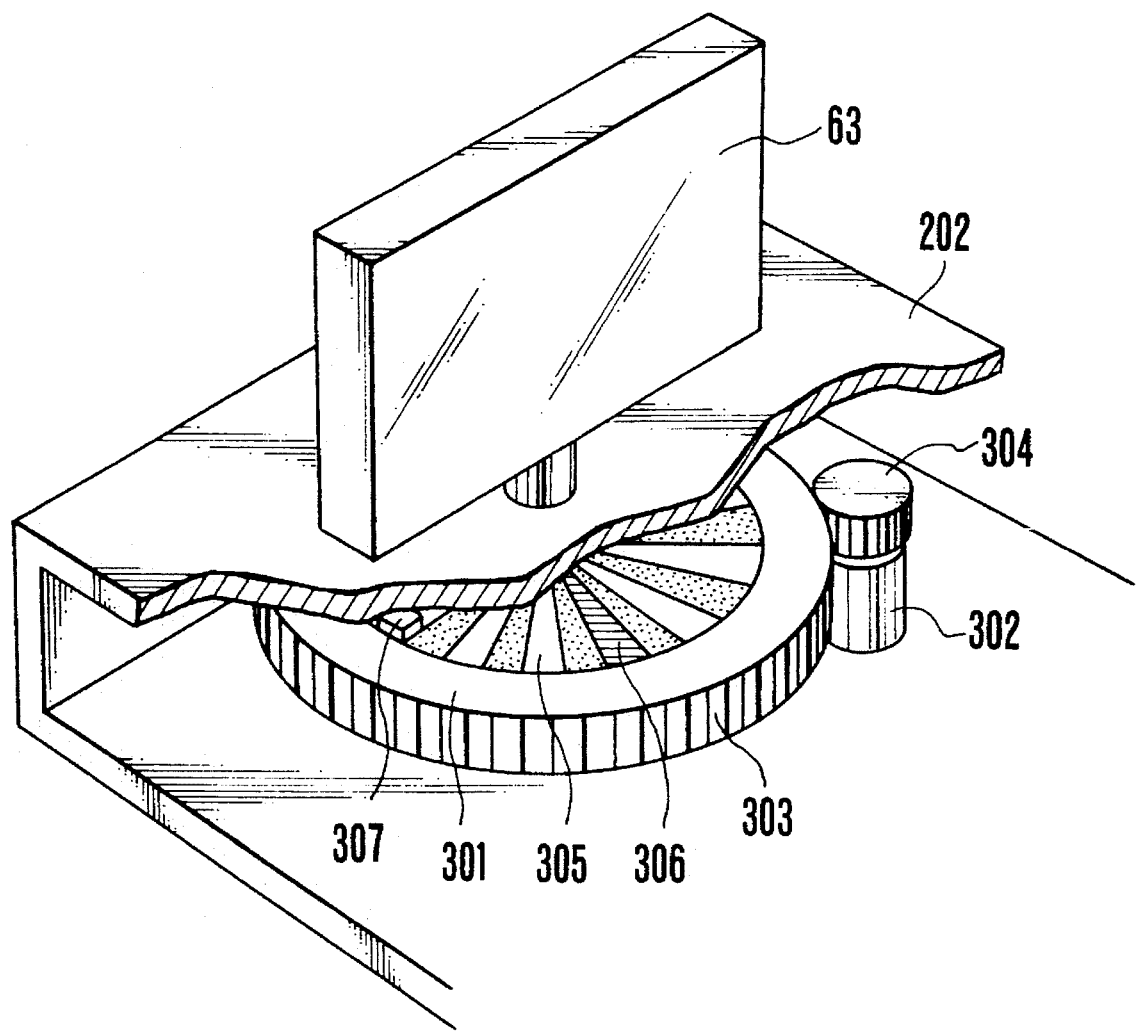
FIG. 14 is an oblique view showing a panning driving part of the fifth embodiment.

The panning action of the fifth embodiment is described with reference to FIG. 14 as follows: The mirror 63 is carried by a rotary base 301 and is arranged to be caused to rotate by the engagement of a gear 303 formed along the periphery of the rotary base 301 with a gear 304 formed on driving means 302 which is disposed on the stationary base 202. An ordinary DC motor is employed as the driving means 302.

To the upper surface of the rotary base 301 is secured a reflection plate 305 which has reflection parts. The reflection parts are divided at a given angle. A first photosesnsor 307 is arranged on the stationary base 202 to detect the rotation angle of the rotary base 301 (the mirror member 63). The rotation angle is controlled by control means which is not shown. Among the reflection parts of the reflection plate 305, a reflection part 306 which serves as a datum part has a different reflection factor from the reflection factor of other reflection parts. A zero position is thus arranged to be detected by a change in the output of the photosensor 307.

Figure 15:
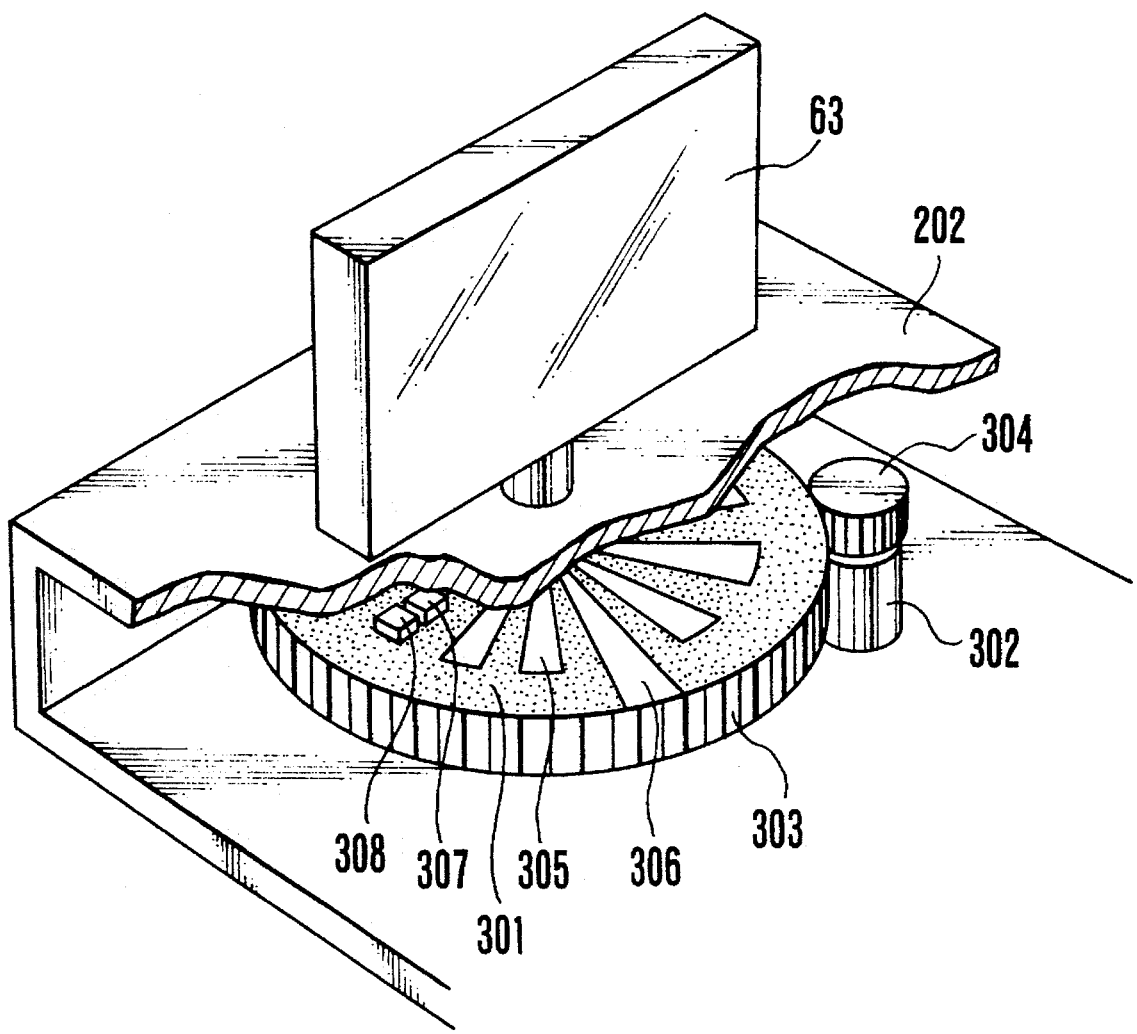
FIG. 15 shows by way of example a modification of the embodiment shown in FIG. 14.

Referring to FIG. 15, it is possible to detect the zero position by means of a second photosensor 308 by changing the length of the datum reflection part 306.

In another possible modification, the position detecting action can be accomplished by means of a limit switch which uses a micro-switch or the like. In that case, the zero position is initially set when the power supply is turned on or off.

Further, the above-stated control means is provided with storage means for storing data of a plurality of positions. Therefore, with the zero position and the rotation angle detected by the position detecting means as described above, the mirror member 63 can be turned to a position stored in the control means.

In accordance with the arrangement of the fifth embodiment, the panning action is performed on the mirror member 63 which is lighter than the video camera 61. Therefore, panning can be carried out at a higher speed than ordinary panning. With this arrangement applied to the first to fourth embodiments described in the foregoing, the arrangement enables them to more speedily and more accurately carry out panning. A tilting action also can be carried out at a high speed by a similar arrangement.

Figure 16:
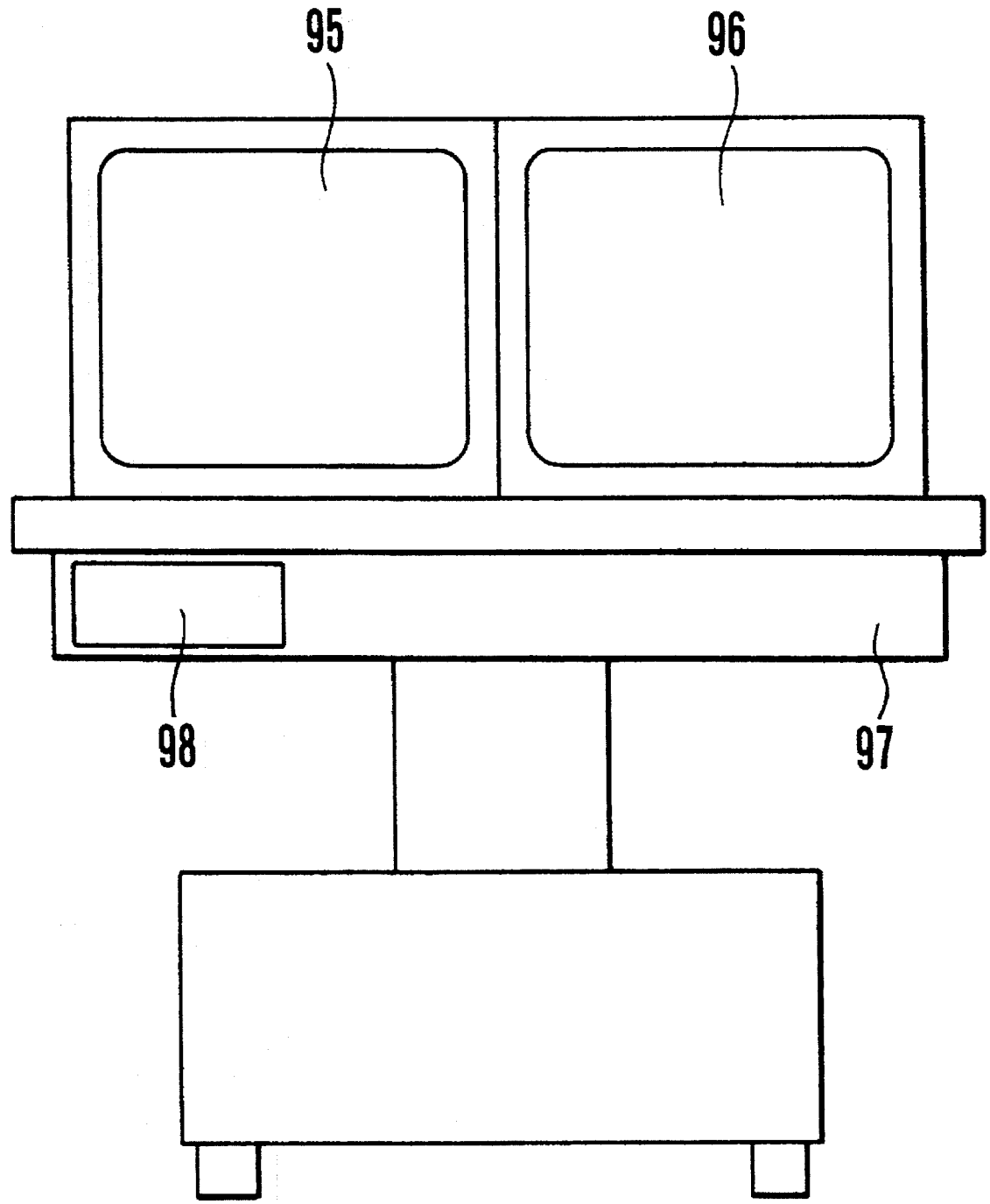
FIG. 16 shows a video conference system using the fifth embodiment of the invention.

FIG. 16 shows a video conference system using the embodiment described above. In the system, monitors 95 and 96 are arranged to receive signals transmitted and to confirm the signal transmission. A rack 97 which has a part housing a coder-decoder 97 therein is arranged to have a monitor—image pickup unit mounted thereon. Reference numeral 98 denotes the video camera apparatus which is arranged as the fifth embodiment described above and is disposed within the rack 97.

As described above, the embodiment is capable of carrying out panning at a high speed. Therefore, the panning operation can be accomplished toward a speaker without much delay and in time for the speech being made by the speaker, for example, in a video conference. In a case where the speed of panning is to be controlled according to the zoom ratio as in the case of the first embodiment, the panning speed can be set as desired, so that any unpleasant impression due to panning can be minimized.

Further, while each of the embodiments has been described as applied to a video conference system, the invention is not limited to this but is applicable to any case where the image and the speech of a speaker are to be picked up. The invented arrangement is also applicable to general cases where the images of ordinary objects are to be picked up.

What is claimed is:

1. A video camera apparatus comprising:
  a) a video camera having a zoom lens;
  b) a support base arranged to carry said video camera and to permit at least a panning operation or a tilting operation on said video camera;
  c) driving means for driving said support base to perform the panning operation or the tilting operation; and
  d) control means for varying a zoom ratio of said zoom lens according to the panning operation or the tilting operation of said support base.

2. An apparatus according to claim 1, further comprising zoom ratio detecting means for detecting the zoom ratio of said zoom lens.

3. An apparatus according to claim 1, further comprising speed detecting means for detecting the speed of the panning operation or the tilting operation of said support base.

4. An apparatus according to claim 1, further comprising first detecting means for detecting the zoom ratio of said zoom lens, storage means for storing a result of detection made by said first detecting means, and second detecting means for detecting the speed of the panning operation or the tilting operation of said support base.

5. An apparatus according to claim 4, wherein said control means is arranged to vary the zoom ratio of said zoom lens according to a zoom ratio which is obtained before the panning operation or the tilting operation of said support base and which is stored in said storage means and according to a result of detection made by said second detecting means.

6. An apparatus according to claim 1 or 5, further comprising a monitor arranged to display image information picked up by said video camera.

7. An apparatus according to claim 6, further comprising pictorial frame setting means arranged to permit a pictorial frame corresponding to the zoom ratio to be displayed by said monitor together with the picked-up image information.

8. An apparatus according to claim 1, wherein said support base has a mirror part which is rotatably carried, said mirror part being arranged to reflect an object image and to have the reflected object image incident on said video camera.

9. An apparatus according to claim 8, further comprising image processing means arranged to invert an image picked up by said video camera with regard to right and left.

10. A video camera apparatus comprising:
  a) a video camera having a zoom lens;
  b) a support base arranged to carry said video camera and to permit at least a panning operation or a tilting operation on said video camera;

c) driving means for driving said support base to perform the panning operation or the tilting operation; and d) control means for varying a zoom ratio of said zoom lens according to the speed of the panning operation or the speed of the tilting operation of said support base.

11. An apparatus according to claim 10, further comprising zoom ratio detecting means for detecting the zoom ratio of said zoom lens.

12. An apparatus according to claim 10, further comprising speed detecting means for detecting the speed of the panning operation or the tilting operation of said support base.

13. An apparatus according to claim 10, further comprising first detecting means for detecting the zoom ratio of said zoom lens, storage means for storing a result of detection made by said first detecting means, and second detecting means for detecting the speed of the panning operation or the tilting operation of said support base.

14. An apparatus according to claim 13, wherein said control means is arranged to vary the zoom ratio of said zoom lens according to a zoom ratio which is obtained before the panning operation or the tilting operation of said support base and which is stored in said storage means and according to a result of detection made by said second detecting means.

15. An apparatus according to claim 10 or 14, further comprising a monitor arranged to display image information picked up by said video camera.

16. An apparatus according to claim 15, further comprising pictorial frame setting means arranged to permit a pictorial frame corresponding to the zoom ratio to be displayed by said monitor together with the picked-up image information.

* * * * *